Oct. 16, 1928.
R. L. ELLERY
1,687,752
BATTERY PLATE
Filed Nov. 1, 1926
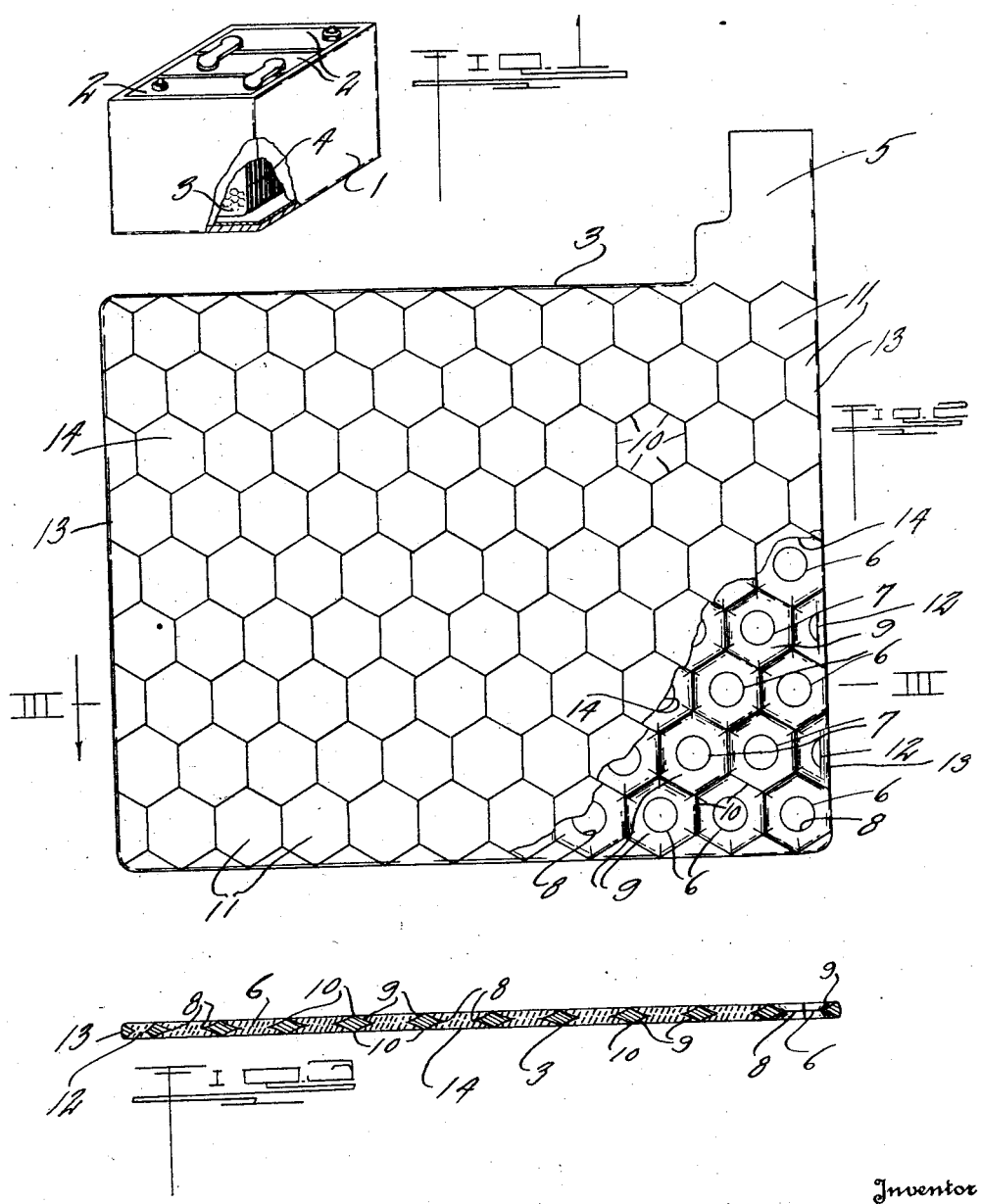
Inventor
Robert L. Ellery
By
Geo. E. Kirk
Attorney Patented Oct. 16, 1928.

1,687,752

UNITED STATES PATENT OFFICE.

ROBERT L. ELLERY, OF TOLEDO, OHIO.

BATTERY PLATE.

Application filed November 1, 1926. Serial No. 145,460.

This invention relates to secondary or storage batteries.

This invention has utility when incorporated in secondary battery plates with grids having paste therein.

Referring to the drawings:

Fig. 1 is a perspective view, with parts broken away, of an embodiment of the invention in the plates of a lead plate type of storage battery;

Fig. 2 is an enlarged side elevation of a plate of Fig. 1 battery, with a portion of the paste oxid filler removed therefrom; and Fig. 3 is a section on the line III—III, Fig. 2.

Case 1 is shown as having therein three cells 2 which contain plates 3, 4. The plates 3 are provided with upstanding mounting terminals 5. The body of the plate 3 has therethrough circular openings or holes 6 in rows parallel to and staggered as to rows of similar holes 7, whether the rows be construed as horizontally extending or vertically extending.

Each hole 6, 7, is bounded by a thin fin 8 from which extends spreading plate grid portions of concave face wedge regions 9 terminating in ribs 10 registering upon opposite sides of the plate 3 at the outer plane of such plate in outlining hexagons 11 interfitting and concentric with the openings 6, 7. These outlined hexagons 11 have the ribs 10 therebetween, providing the common bounding region for the adjacent hexagons. The marginal regions of the plate 3 carry fractional openings 12, closed as to the outer edge of the plate by rib portions 13. Paste filler 14 is anchored through the openings 6, 7, 12, and spreads snugly to reinforce the fins 8 as lying in a common medial plane of the plate 3. The filler as impacted into these openings, is desirably applied in quantity up to a thickness flush with the ribs 10. The ribs 10, 13, thus outline the form of the plate, and provide as to the intermediate plate portion, the stiffening grid which carries the paste filler 14.

This hexagonal superficial rib outlined structure exposes approximately the full plate surface area or extent for the paste to be acted upon. The lead skeleton of the plate is of maximum extent centrally or in the medial plane of the plate. The filler as hardened through the openings, is of button form and self anchoring. There is accordingly a considerable volume of the filler, while the skeleton is of a minimum quantity for the retention of plate rigidity, even under the vibration conditions of motor vehicle usage. The plate is bilaterally symmetrical, with the configurations registering one side as to the other, resulting in direct reinforcement of the plate from rib face to rib face by intermediately greater strength portions. The similar area of abutting hexagons determines pockets of maximum area for a minimum lineal extent of bounding rib or exposed lead grid portions. Each straight line rib section is a common bounding means for a side of two pockets in the general extent of the grid.

What is claimed and it is desired to secure by Letters Patent is:

1. An electric battery plate embodying a grid having hexagonal pockets peripherally abutting, the grid portion as bounding the pockets having in cross section adjacent side portions approaching each other at an acute angle to form a fin in the plane of the plate, with the hexagonal portion of the pocket approximating the plane of an outer face of the grid.

2. An electric battery plate embodying a grid having polygonal pockets peripherally abutting, said pocket bounding grid portion being in cross section of four-sided closed figure formation with the maximum diagonal in the plane of said plate to provide an endless fin terminating in a thin edge in each pocket with said edge a greater distance from the pocket corners than from the pocket polygonal sides.

In witness whereof I affix my signature.

ROBERT L. ELLERY.